J. L. CARDER.
DEVICE FOR PREVENTING FROSTS IN ORCHARDS.
APPLICATION FILED MAY 2, 1913.

1,111,993.

Patented Sept. 29, 1914.

Witnesses:
C. W. Stahl
C. H. Sayles

Inventor:
James L. Carder.

UNITED STATES PATENT OFFICE.

JAMES L. CARDER, OF LOS ANGELES, CALIFORNIA.

DEVICE FOR PREVENTING FROSTS IN ORCHARDS.

1,111,993. Specification of Letters Patent. Patented Sept. 29, 1914.

Application filed May 2, 1913. Serial No. 765,156.

*To all whom it may concern:*

Be it known that I, JAMES L. CARDER, a citizen of the United States, residing in the city of Los Angeles, county of Los Angeles, State of California, have invented a new and useful Improvement in Devices for Preventing Frosts in Orchards, of which the following is a specification.

This invention consists in an apparatus for heating air, and forcing the heated air through pipes, for distribution at certain fixed points in an orchard, and has for its object to provide a new and useful apparatus for heating the unconfined air in and about orchards bearing fruit requiring a warm and frostless atmosphere, and has special reference to the protection of orange orchards from frosts. This object has hitherto been effected by the burning of crude oil in receptacles known as "smudge pots," placed at regular intervals among the orange trees, but that process compared with this invention, is very expensive, is not a successful preventative of frosts, and is extremely offensive to residents in the vicinity where the smudging process is employed.

An additional advantage derived from the present invention, is its inoffensiveness, it eliminating the dense smoke which is unavoidable in the present system of smudging.

Figure 1:
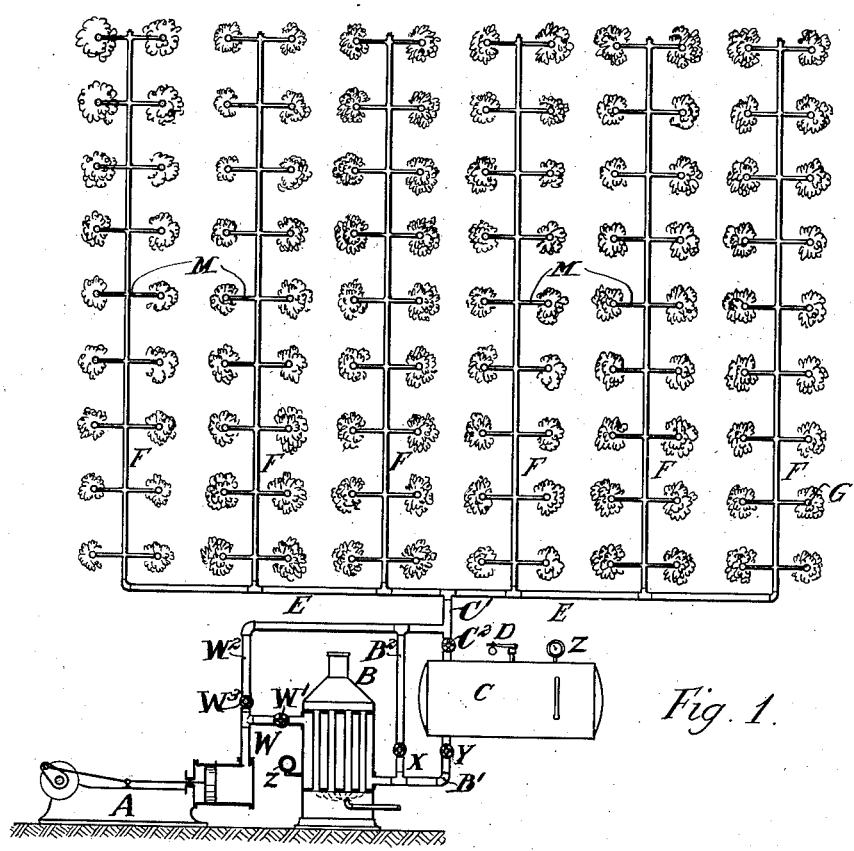
Figure 3:
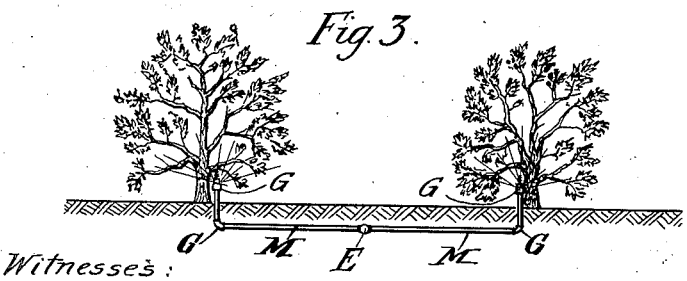
Figure 2:
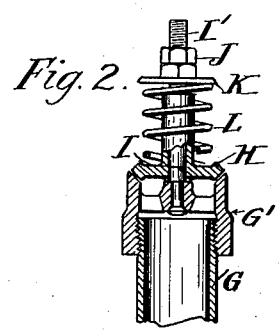

Referring to the accompanying drawings, Figure 1 is a plan view of an orchard, equipped with distributing pipes and ejecting nozzles and with the operating mechanism in side elevation. Fig. 2 is a vertical section of the spraying or ejecting nozzle, and Fig. 3 is a view showing the manner in which the spraying nozzles in the trees are connected up with the mains.

In carrying out my invention, I provide an air compressor $A$ of any suitable type, which is connected up by means of a pipe $W$ with a heater $B$, the pipe $W$, having a valve $W^1$, by means of which the heater may be cut out of the system. A reservoir or tank $C$ connected up with the heater by suitable pipe connections $B^1$, has a check-valve $Y$ below the tank to prevent back-flow therefrom, and the upper side of the tank has an outlet pipe $C^1$, which discharges into the distributing mains $E$, this pipe having a cut-out valve $C^2$, as shown. This tank has, preferably, a pressure-indicating gage $D$. A pipe $W^2$ extends from the discharge pipe $W$ of the air compressor to the discharge pipe $C^1$ of the tank $C$, connecting at a point above the valve $C^2$, and a valve $W^3$ is placed in the line of this pipe. A by-pass pipe $B^2$ also connects the two pipes $W^2$, and $B^1$, this pipe having therein a cut-out valve $X$. The boiler, as well as the storage tank, has a thermometer $Z$ by means of which the temperature may be observed.

The orchard has each tree equipped with a spraying or ejecting nozzle, shown in Fig. 2, in which the end of the vertical pipe $G$ is threaded to receive thereon a threaded shell $G^1$. This shell has its upper end open and is ground to receive thereon a valve $H$, which is vertically-movable on a stem $I$. The lower end of the stem is fixed to a spider-frame with the shell $G^1$, and the upper end of the stem is threaded, as at $I^1$, to receive a pair of nuts $J$. Below the nuts is a disk $K$, and between the disk and the cap $H$ is a spiral spring $L$, which serves to normally keep the cap on its seat, and the nuts are designed to regulate the pressure of the spring. The distributing main $E$ is connected up by branch mains $F$ between the rows of trees, and each main has laterals $M$, all of which are carried along beneath the surface of the ground at suitable depths, and at the ends of the branch mains are the vertical discharge pipes $G$, which carry the spraying or ejecting nozzles. It will be observed that each vertical pipe extends up into the tree alongside of the trunk, the object being to convey the heated air as far up into the branches as possible.

In operation, for the purpose of ejecting heated air through the system, the heater is ignited, and the valves $W^3$ and $X$ closed. When the compressor $A$ is set in motion, air is forced through the heater $B$ into the tank $C$, the valve $C^2$ in the outlet pipe being meanwhile closed, and when a sufficient pressure is reached the valve $C^2$ is opened, and the outflow regulated thereby. It is obvious that by closing the valves $C^2$ and $W^3$, and opening valves $W^1$ and $X$, heated air may be distributed to the orchard heating system without passing through the tank.

It is obvious that by the ejecting devices herein shown, I am able to cheaply and effectively reduce the temperature at each tree by the action of a single operative unit, and thereby save a great deal of time in the application of the heat.

In addition to the value of the system as a heating plant, it will be understood that the same distributing system may be used for irrigating purposes in which case the water is delivered to each individual tree, and thereby greatly effecting an economy in the amount of water required.

What I claim as new is:

An orchard heater, comprising a series of distributing pipes, a plurality of ejecting nozzles at convenient points, a tank connected with the distributing pipes, a heater and an air compressor operatively connected up with said tank, and means for regulating the temperature of the air and the out-flow of the heated air.

In testimony whereof I have hereunto set my hand at Los Angeles, California, this 15th day of April, 1913.

JAMES L. CARDER.

Witnesses:
C. W. STAHL,
C. H. SAYLES.